United States Patent [19]

Schneider et al.

[11] 4,262,171
[45] Apr. 14, 1981

[54] TELEPHONE SYSTEM IN WHICH COMMUNICATION BETWEEN STATIONS IS CONTROLLED BY COMPUTERS AT EACH INDIVIDUAL STATION

[75] Inventors: Alan A. Schneider; Govind R. Gadwal, both of Reisterstown, Md.

[73] Assignee: Catalyst Research Corporation, Baltimore, Md.

[21] Appl. No.: 2,067

[22] Filed: Jan. 8, 1979

Related U.S. Application Data

[63] Continuation-in-part of Ser. No. 824,348, Aug. 15, 1977, abandoned.

[51] Int. Cl.³ .......................... H04J 1/06; H04M 9/02
[52] U.S. Cl. .................................. 179/18 BF; 370/30; 370/69
[58] Field of Search .................. 179/37, 1 H, 18 BF, 179/84 T; 340/147 P, 147 F; 370/71, 69, 76, 57, 30, 32

[56] References Cited

U.S. PATENT DOCUMENTS

| | | | |
|---|---|---|---|
| 3,345,466 | 10/1967 | Rahmig | 179/1 H |
| 3,428,899 | 2/1969 | Sekimoto | 325/55 X |
| 3,535,636 | 10/1970 | Muilwijk | 325/55 X |
| 3,809,815 | 5/1974 | Reed et al. | 179/15 FD |
| 3,864,521 | 2/1975 | De Long et al. | 179/2.5 R |
| 3,891,804 | 6/1975 | Hachenburg | 179/15 AL |
| 3,894,197 | 7/1975 | Cowpland et al. | 179/84 T X |
| 4,019,176 | 4/1977 | Cour et al. | 179/15 AL X |
| 4,020,289 | 4/1977 | Anderson | 179/15 FD |
| 4,049,914 | 9/1977 | Anderson et al. | 179/2.5 R |
| 4,107,471 | 8/1978 | Reed | 179/15 FD |
| 4,155,040 | 5/1979 | Harmon et al. | 343/177 X |

FOREIGN PATENT DOCUMENTS

| | | | |
|---|---|---|---|
| 1178693 | 1/1970 | United Kingdom | 179/15 FD |
| 1178694 | 1/1970 | United Kingdom | 179/15 FD |

Primary Examiner—Thomas W. Brown
Attorney, Agent, or Firm—Brown, Flick & Peckham

[57] ABSTRACT

A telephone system is provided which requires no central office. All the stations on the system are interconnected by a single line or cable and each station includes a computer which carries out the necessary switching. Each station is then able to call any other station, or to respond to a call, without requiring any central office. Frequency division multiplexing is used to permit a number of conversations to be carried on simultaneously and two frequencies are assigned to each conversation to permit duplex operation. A page capability is also provided.

14 Claims, 6 Drawing Figures

TELEPHONE SYSTEM IN WHICH COMMUNICATION BETWEEN STATIONS IS CONTROLLED BY COMPUTERS AT EACH INDIVIDUAL STATION

CROSS-REFERENCES TO RELATED APPLICATIONS

This application is a continuation-in-part of application Ser. No. 824,348, filed Aug. 15, 1977, and now abandoned.

BACKGROUND OF THE INVENTION

The present invention relates to telephone systems, and more particularly, to a system which requires no central office and which is simple and relatively inexpensive to install and use.

The system is particularly suitable for use in mines, although its usefulness is obviously not limited to this particular application and it is capable of use generally in any desired location. There is a need for improved communication equipment in the mining industry which could contribute significantly to improved safety and working conditions as well as to increased productivity. A mine presents an extremely harsh environment and equipment for use in a mine must be able to withstand rough treatment in use as well as exposure to coal dust and rock dust and to high humidity or dripping water. Such equipment must be capable of use by miners and its operation should, therefore, be simple and as much like that of the familiar public telephone system as possible. Such a telephone system should also be reasonable in cost and easy to install and to maintain, and for safety reasons should provide at least one private channel.

SUMMARY OF THE INVENTION

The present invention provides a telephone system which meets the requirements discussed above and which is relatively simple to install and operate. In conventional telephone systems, a central office is required to perform the necessary switching to connect one telephone to another. The new system requires no central office and no equipment of any kind connected to the line except what is included as an integral part of each station. The system, therefore, consists only of a single line interconnecting the desired number of telephone stations. Each station includes transmitting means and receiving means and also includes integral switching means, preferably in the form of a computer, which senses and responds to frequency multiplexed signals from other stations. The computers in the individual stations, therefore, sort out the various signals on the line and establish communication between particular stations as called for. A completely distributed system is thus provided as no other equipment is necessary and the computers in the individual stations, in effect, perform the required switching and communicate with each other as necessary to control the operation of the system.

More particularly, the system consists of a single line cable, which may be a shielded twisted pair, interconnecting the desired number of telephone stations, each of which consists of a handset generally similar to the conventional handset and a box or enclosure for the computer and other electronic components. Low-frequency carrier transmission is used which makes it possible to use a single twisted-pair cable, rather than a coaxial or multiple pair cable, with low attenuation so that no repeaters are needed. Frequency division multiplexing is used to allow simultaneous transmission of a number of conversations and duplex operation is preferably obtained by assigning two frequencies to each conversation. Since the system is controlled entirely by the computers in each station and no central office is required, the system is relatively inexpensive to install and additional telephones can be added at a later time as required. The system is easy to install and is easy to repair as the equipment is modular and no special tools are required. A break in the line can be easily repaired by splicing and is not necessarily serious as each station of a broken line is still a complete telephone system and stations on each section can still communicate with each other. Operation of the system by the users is simple as calls are made on a handset by means of a standard keyboard in the same manner as in a conventional system. All channels are private and all switching and other operations are controlled by the computers at each station. In addition to the desired number of voice channels for private conversation, a page channel is also provided so that a page message can be transmitted to loudspeakers at each station.

The computers at each station which control operation of the system may be digital computers of any desired type and, while they are preferably microcomputers built up of integrated circuit components for compactness, they could utilize hardwired logic circuits and other components, if desired, or could be of any suitable type or construction. Any desired type of frequency multiplexing could be used, including simplex and single sideband duplex, as well as the two-frequency duplex system more fully described hereinafter.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
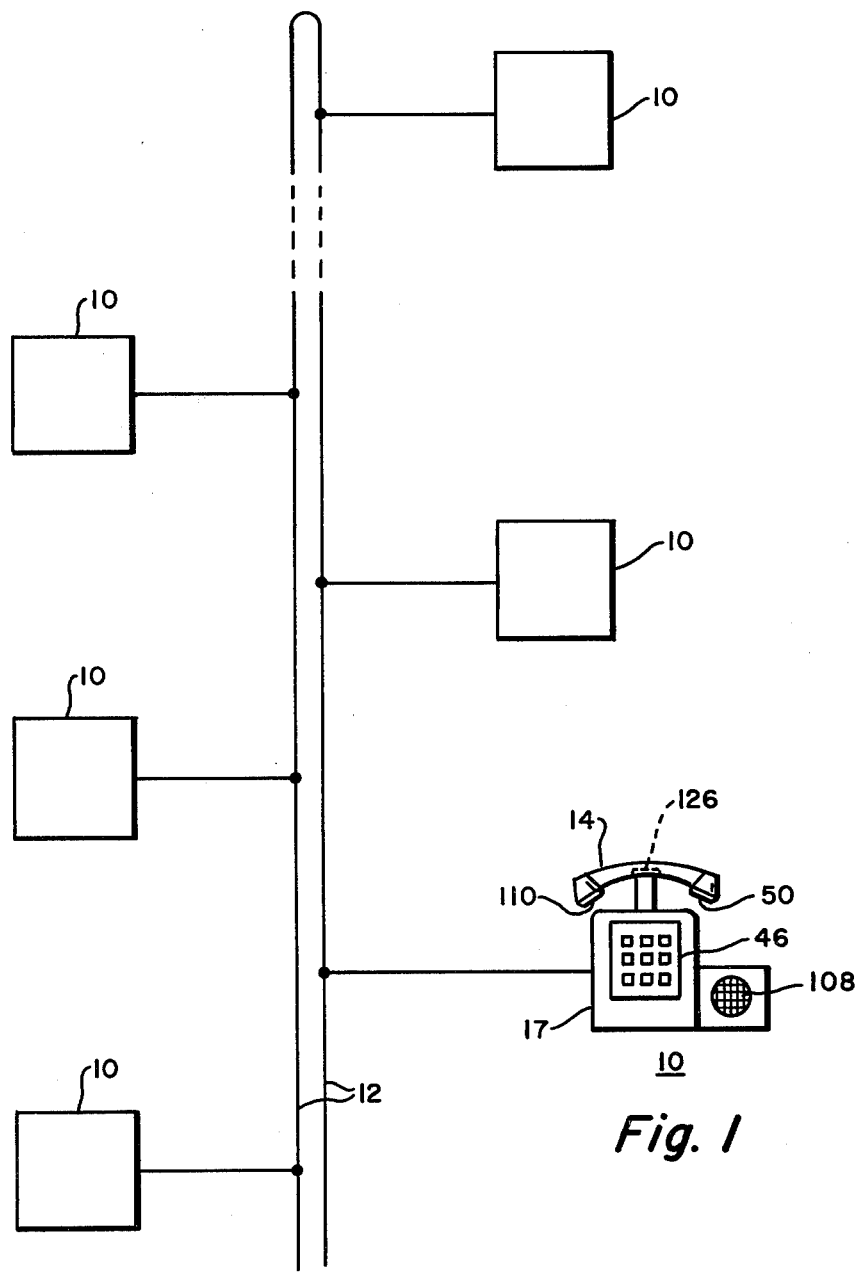
FIG. 1 is a diagram showing a complete telephone system embodying the invention.

As shown in FIG. 1, the system consists of a number of individual telephone stations 10 interconnected by a single line or cable 12 which may be a single shielded twisted-pair cable to prevent pickup of stray currents. The line 12 may be extended as required throughout a mine, or other area where telephone service is to be provided, and the necessary number of individual stations 10 are connected to the line at the points where service is needed. Each of the stations 10 includes a handset 14 which may be generally similar to the conventional handset with a transmitter or microphone 50 and a receiver or earphone 110. The handset 14 also includes a push-to-talk switch 126 which, in this system, is used to signal the computer as will be described later. The station 10 also includes a box or enclosure 17 for the computer and other electronic components and a loud-speaker 108 is provided at each station. The speaker 108 may be built into the box 17 or may be mounted separately if desired. A keyboard 46 is provided at each station and may be of the conventional pushbutton type for calling a desired number or, if desired, a dial or other suitable keying device could be used to enable the caller to dial the number of the station he is calling.

The power supply may be of any suitable type and has not been shown in the drawings to avoid unnecessary complication. Preferably, the equipment is designed to operate on 12-volt rechargeable battery cells which may be recharged by means of the line cable itself, if the line is not too long, or which may be recharged in any other suitable manner. Power may also be supplied by means of a twisted power cable run parallel with the line cable or, if the distances are not too great, power could be supplied through the line cable itself if it is sized properly to minimize voltage drop.

As indicated above, the system is a totally distributed system and requires no equipment connected to the line except the individual stations themselves as shown in FIG. 1. Each station includes transmitting means, receiving means and switching means in the form of a computer. Frequency multiplexing is used to permit a number of simultaneous conversations. In general, the operation involves the presence on the line of a number of different carrier frequencies transmitted by different stations. The computers at each station sense the various frequencies and respond in a manner to establish communication between particular stations as called for. This may be done in any desired manner using any type of frequency multiplexing including simplex, duplex, AM, FM, SSB and BSB, for example.

Figure 2A:
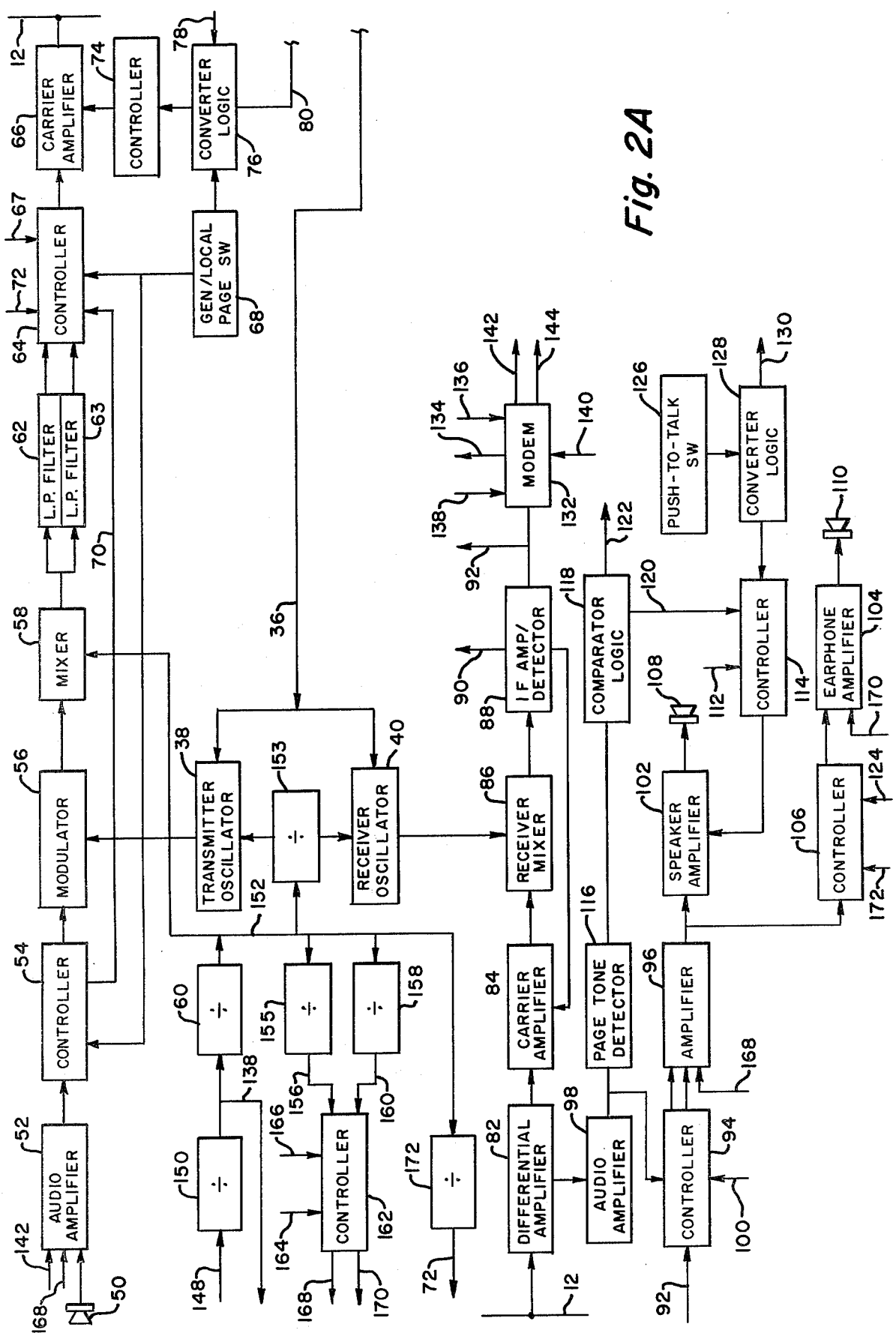
FIGS. 2A and 2B (with FIG. 2B being to the right of FIG. 2A) comprise a schematic diagram showing the equipment included in each telephone station on the system.
Figure 2B:
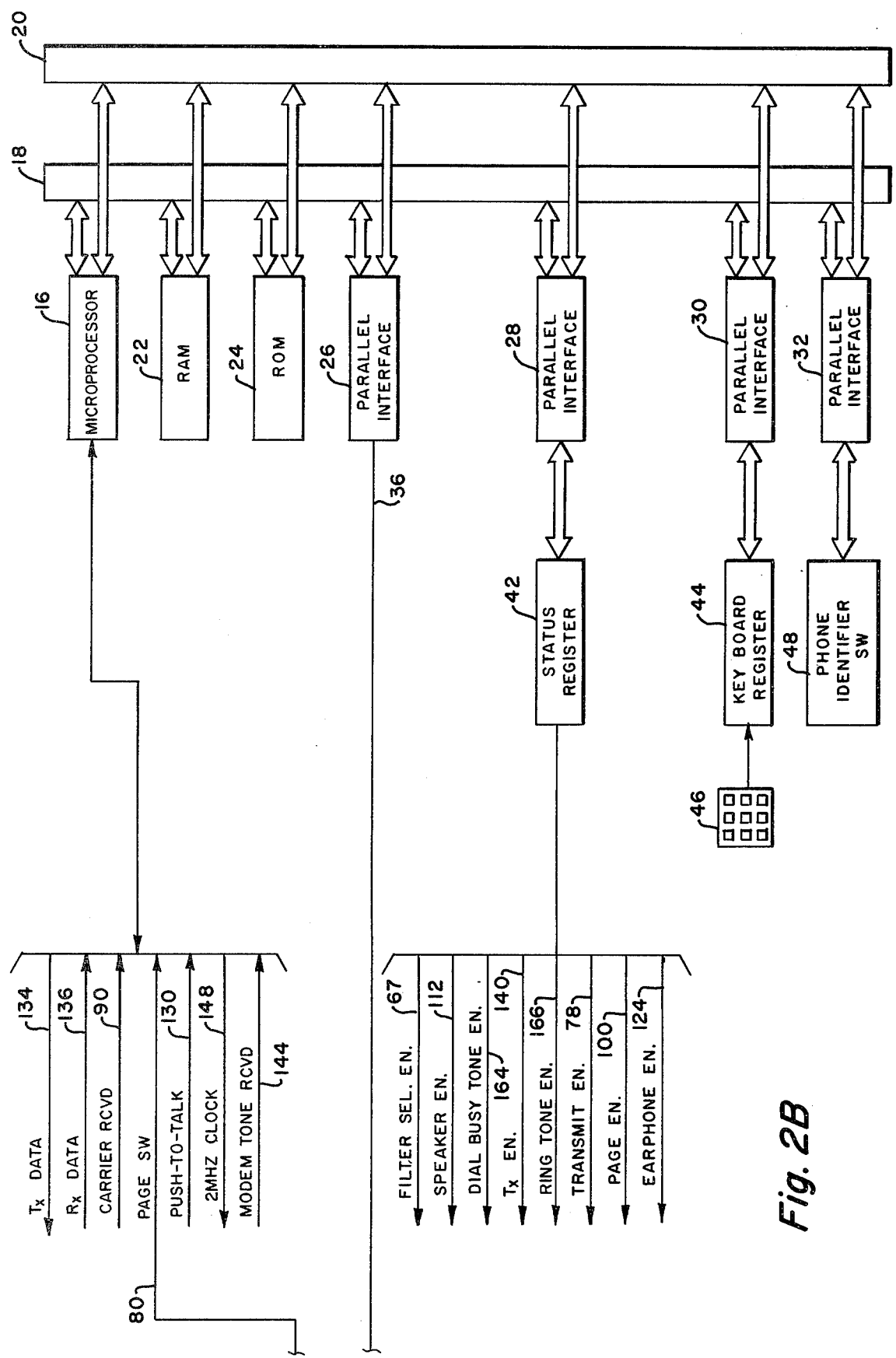

A preferred embodiment of the system is shown in FIGS. 2A and 2B, although it will be understood that other types of frequency multiplexing could be used. FIGS. 2A and 2B show, in block diagram form, the electronic equipment and functions included in each station 10 on the system. As previously described, this equipment is contained in the box 17 at each station which may be sealed to protect the equipment against the adverse environmental conditions of locations such as mines. The electronic components at each station may be grouped into three parts, that is, a transmitter, a receiver and a computer, and the components may be solid state or integrated circuit devices of known or standard types.

With specific reference to FIGS. 2A and 2B, each station includes a microprocessor 16 (FIG. 2B) connected through control and data buses 18 and 20 to a random access memory 22 and a read-only memory 24. The control and data buses 18 and 20 are also connected to parallel interfaces 26, 28, 30 and 32. Parallel interface 26 is connected through lead 36 to a local transmitter oscillator 38 (FIG. 2A) as well as a local receiver oscillator 40 in a manner hereinafter described. The interface 28, through a status register 42 produces various output signals for controlling transmitting and receiving functions of the station in a manner hereinafter described. Interface 30 is connected to a read keyboard register 44 which, in turn, is connected to the pushbutton keyboard 46, also shown in FIG. 1. As will be seen, the operator depresses buttons on the keyboard 46 to identify a station he wishes to call. Finally, parallel interface 32 is connected to phone identification switches 48 which identify a particular station in the system by two digits (e.g., 25).

A transmitting section at each station (top of FIG. 2A) generates amplitude modulated carrier signals for transmission on the line 12. The carrier signals transmitted are preferably of relatively low frequency in order to minimize attenuation of the signals so that repeaters are not required. In an illustrative embodiment of the invention, for example, the carrier frequencies transmitted over the line 12 are at discrete, separated frequencies in the range of 15 to 145 kilohertz to provide nine voice conversation channels, as is more fully described hereinafter. An audio signal is derived from the microphone 50, amplified in amplifier 52 and applied through a controller 54 to a modulator 56. A carrier frequency is generated in the local transmitter oscillator 38 which, in the illustrative example, generates frequencies in the range of 215 to 345 kilohertz. The carrier is modulated by the audio signal from amplifier 52 in modulator 56 and fed to a mixer 58 supplied with a fixed frequency signal of 200 kilohertz derived from a frequency divider 60. The mixer 58 generates sum and difference frequencies and the difference frequency (15 to 145 kilohertz) is passed through either low-pass filter 62 or low-pass filter 63 to a controller 64 and thence through a carrier amplifier 66 to the line 12. Controller 64 determines which filter is employed as dictated by the microprocessor 16. As will be hereinafter explained, any station in the system can transmit on one of two frequencies determined by its phone identification number entered into switches 48 (FIG. 2A). Normally, transmission will occur on the lower of the two frequencies unless it is being used by another station in the system. If the lower frequency is being used, then the higher frequency will be selected. It is for this reason that two low-pass filters 62 and 63 are required. Which filter is employed is determined by a signal on lead 67 derived from the status register 42 for microprocessor 16.

For page signals, the general/local page switch 68 of FIG. 2A is provided. If it is desired to page all of the stations in the system via a loud-speaker, switch 68 actuates the controller 54 to apply the audio signal from the microphone 50 to lead 70 which is connected directly to the controller 64. In controller 64, the page audio signal on lead 70 is mixed with a page tone signal on lead 72, derived in a manner hereinafter described, and applied through the carrier amplifier 66 to the line 12. Typically, the page tone signal may have a frequency of 4 kilohertz, slightly above the audio frequency range. However, when the switch 68 is actuated for a local page to be sent to only one station in the system, the controller 54 passes the audio signal through modulator 56 and mixer 58.

The carrier amplifier power output is controlled by a controller 74. In this regard, the controller acts to turn ON the amplifier and connect it to the line 12 only when a modulated carrier signal exists or a local page tone exists. Control of the controller 74 and carrier amplifier 66 is an "OR" function. Either the page switch 68 via the converter logic circuit 76 or the microprocessor via lead 78 from status register 42 (FIG. 2B) control the power on the carrier amplifier and transmitter circuits. An indication of page switch actuation is sent to the microprocessor 16 via lead 80. As was explained above, the audio from the microphone 50 must be switched into the modulator 56 for private and local page modes or into the carrier amplifier through controller 64 along with the page tone signal on lead 72 for the general page mode wherein each station in the system is paged.

The receiver portion of each telephone station (bottom of FIG. 2A) is directly connected to the line 12 through a differential amplifier 82 which provides for a high impedance input and a low impedance single-ended output. It will be apparent that the line 12 at the carrier amplifier 66 is the same as that connected to amplifier 82. The carrier frequency signals appearing at the output of amplifier 82 pass through a carrier amplifier 84 and thence to a receiver mixer 86. The receiver utilizes the superheterodyne detection principle which means that an intermediate frequency output signal is derived by combining the carrier signal with a locally-generated frequency from oscillator 40 in such a manner that the carrier frequency is added to the locally-generated frequency from oscillator 40 to provide the intermediate frequency output. In the illustrative embodiment, the intermediate frequency is chosen as 455 kilohertz and the locally-generated frequency must, therefore, be in the range of 310 to 440 kilohertz for the range of carrier frequencies previously mentioned (i.e., 15 to 145 kilohertz). The intermediate frequency signal from mixer 86 is then applied to an intermediate frequency amplifier and detector 88 which, when a carrier is received, produces a carrier received signal on lead 90 connected to the microprocessor 16 (FIG. 2B).

The audio signal appearing on lead 92 is applied through a controller 94 in the receiver to an amplifier 96. Page signals at the output of differential amplifier 82 are also applied through an audio amplifier 98 to the controller 94. Controller 94 will pass local page signals or detected audio signals on lead 92 to the amplifier 96 depending upon the signal on lead 100 which, in turn, is connected to the status register 42 of FIG. 2B. Assuming that the microprocessor 16 establishes that audio signals recovered from the carrier frequency or audio amplifier 98 are to be amplified in amplifier 96, the controller 94 will direct those signals to the amplifier 96. The output of amplifier 96, in turn, is connected to speaker amplifier 102 or earphone amplifier 104 through controller 106. The amplifiers 102 and 104, in turn, are connected to the speaker 108 and the earphone 110, also shown in FIG. 1. Speaker amplifier 102 will be activated to apply signals to the speaker 108 only when a signal on lead 112 is applied to controller 114. The signal on lead 112, in turn, is derived from the status register 42 of FIG. 2B. The controller 114, however, will not enable speaker amplifier 102 unless a page tone detector 116 detects a page tone to cause comparator logic circuit 118 to produce a signal on lead 120 along with that on lead 112 from the status register 42 of FIG. 2B. Assuming that a page tone is not received, a signal on lead 122 from the comparator logic circuit 118 together with a signal on lead 124 from the status register 42 of FIG. 2B will enable the controller 106 to pass audio signals to the earphone amplifier 104 and earphone 110.

The push-to-talk switch 126, also shown in FIG. 1, is provided in each station. This switch 126 is connected to a converter logic circuit 128 which, when the push-to-talk switch is depressed, produces a signal on lead 130 which is fed back to the microprocessor 16 (FIG. 2B). At the same time, the logic circuitry 128 applies a signal to the controller 114 to insure that the speaker amplifier 102 is not activated when the push-to-talk switch is depressed.

The output lead 92 at the output of amplifier/detector 88 is also connected to the input of a modem 132. The purpose of the modem is to initially establish communication between two stations. As shown, the modem has three input leads and four output leads. Leads 134 and 136 are connected to the microprocessor 16 of FIG. 2B and serve to transmit or receive serial-coded binary signals identifying a particular station in the system. A 1-megahertz modem carrier frequency is applied to the modem 132 via lead 138. The manner in which this carrier is derived will be described hereinafter. Also fed into the modem 132 is an enabling signal on lead 140 from the status register 42 of FIG. 2B. An output signal from the modem on lead 142 is applied to the audio amplifier 52 in the transmitting section during transmission of coded information from a station. A signal on lead 144 indicating that a modem tone has been received is applied to the microprocessor 16 of FIG. 2B.

The manner in which the various different frequency signals in the system are derived will now be described. The microprocessor 16 (FIG. 2B) is provided with an internal 2-megahertz clock, the output of which is applied via lead 148 to a first divider 150 (FIG. 2A) which divides by 2 to produce the 1-megahertz signal on lead 138 which is applied to the modem 132 as described above. The 2-megahertz signal on lead 138 is also divided in divider 60 to provide the 200-kilohertz signal on lead 152 connected to the mixer 58. This 200-kilohertz signal on lead 152 is applied to a divider 153 which generates two 5-kilohertz signals applied to the transmitter oscillator 38 and receiver oscillator 40, respectively. In a similar manner, the signal on lead 152 is divided in divider 155 to produce a 1-kilohertz signal on lead 156 and is divided in divider 158 to produce a 500-hertz signal on lead 160. The signals on leads 156 and 160 are both applied to a controller 162 controlled by signals on lead 164 and 166 at the output of status register 42 of FIG. 2B. The signal on lead 156 of 1 kilohertz is used as a ring tone signal and is applied via lead 168 to the audio amplifier 52 in the transmitter section and to the amplifier 96 in the receiver. This signal occurs when a signal is present on lead 166 at the output of status register 42 indicating that a ring tone is to be produced. On the other hand, when the signal on lead 164 indicates that a dial/busy tone is to be produced, the controller 162 applies the 500-hertz signal on lead 160 to lead 170. Lead 170, in turn, is connected to the earphone amplifier 104 such that when the signal on lead 170 appears, a busy signal will be heard by the user of the system. The 200-kilohertz signal on lead 152 is also applied to a divider 172 which generates a 4-kilohertz signal on lead 72. This signal is applied to controller 64 where it is mixed with the page audio during a general page as previously described.

In the operation of the system of the invention, frequency division multiplexing is used to make a number of different channels available for simultaneous use. Two frequencies are assigned to each conversation to enable duplex operation so that two parties can carry on a conversation in a normal manner. Eleven frequencies are available for conversation. Each station 10 will transmit one of two frequencies as determined by the two binary coded decimal digits of its phone identification switches 48. Corresponding to these two permissible transmit frequencies are the two low-pass filters 62 and 63. The appropriate filter is selected by the microprocessor 16 using the signal on lead 67 to control controller 64 and determine which signal will pass from filter 62 or 63 to the carrier amplifier 66.

As an example, assume that the eleven available carrier frequencies are frequencies 0 through 10. If frequencies 1 and 8 are chosen for the station in question, the two filters 62 and 63 will, respectively, pass these two frequencies to the carrier amplifier 66. Under these circumstances, the phone identification switch 48 is set so that the station has a phone number of either 18 or 81. As will be understood, no other station in the system may have this exact number. In this manner, it will be appreciated that the first ten available frequencies (i.e., frequencies 0 through 9) correspond to the ten decimal digits. The eleventh frequency is present to provide a second frequency to stations whose phone number is a double digit, such as 44.

The operation of the system by the user is essentially the same as that of the familiar public telephone system, so there is no problem in the use of this system by untrained or inexperienced persons. To make a call, the handset at the calling station is picked up and if one of its two allowed frequencies is available for transmission, a dial tone is received by the earphone 110 via lead 170 in response to actuation of the controller 162 by a signal on lead 164 from the status register 42. The caller then calls the desired station by means of the keyboard 46, which can be a conventional pushbutton keyboard or a dial. Once the pushbuttons have been depressed, a ring tone is heard in the loud-speaker 108 of the called station. The called station responds, if possible, on one of its two allowed frequencies; and it is only necessary for the user at the called station to pick up the handset and answer. The conversation then proceeds in the normal manner. A page message can also be transmitted from any station 10 by means of the page switch 68 at that station, and the message is heard on the loud-speakers 108 at all stations on the system. If a call has been made from one station to another and the called station does not answer, however, the same page switch can be used for the calling station to send a page message to the loud-speaker of the called station only, in which case it is not heard at the other stations.

Frequency division multiplexing and duplexing operations are provided by means of the computers at each station which control transmission frequencies of the calling and the called stations. The manner in which this is done can best be explained by a specific example in which the following frequencies are used:

| EXAMPLE | | | | | | | | | | | |
|---|---|---|---|---|---|---|---|---|---|---|---|
| Channel | 0 | 1 | 2 | 3 | 4 | 5 | 6 | 7 | 8 | 9 | A |
| Center Frequency (KHz) | 15 | 25 | 35 | 45 | 55 | 65 | 75 | 125 | 135 | 145 | 115 |

The calling station, that is the station which will initiate the call, has a phone number such as "72". The called station, that is the station which will receive the call, has a phone number such as, for example, "26". The processor at the station having the number 72 responds to actuation of its push-to-talk switch 126 by reading its phone number (i.e., 72) from its phone identification switches 48. The station is thus assigned transmit frequencies of 35 kilohertz and 125 kilohertz from the foregoing example. The receiver at the calling station (72) is tuned first to the lower of these frequencies (35 kilohertz) and the processor determines if this frequency is in use by observing the carrier received signal on lead 90 derived from amplifier/detector 88. That is, the frequency of receiver oscillator 40 at the calling station is adjusted by a signal on lead 36 from interface 26 such that the intermediate frequency at the output of receiver mixer 86 is 455 kilohertz if that channel is in use by another station. If the 35-kilohertz channel is in use by another station, the receiver oscillator output frequency is adjusted to determine whether a carrier received signal appears on lead 90 when a 455-kilohertz signal can be produced at the output of mixer 86. If it is in use, the microprocessor 16 activates the status register 42 to produce a signal on lead 164 whereby a busy signal will be heard at the earphone 110. On the other hand, if the 125-kilohertz channel is unused, the transmitter is tuned to that frequency as hereinafter described and the carrier amplifier 66 switched ON.

Assuming that channel 2 at 35 kilohertz is found to be unused, the transmitter oscillator 38 is locked at a frequency whereby the carrier frequency at the output of mixer 58 at the calling station will be locked at a frequency of 35 kilohertz. In response to the dial tone, the phone number 26 for the called station is entered at the keyboard 46. The processor 16 in the calling station 74 now checks channels 2 and 6 as before. Channel 2, of course, is already in use. If channel 6 were also in use, station 26 could not respond and a busy signal will be generated at calling station 72 by virtue of a busy signal on lead 170 connected to earphone amplifier 104. In the example given, channel 6 is unused so the call can be processed. The calling station always knows which frequency the called station will respond on, having just checked them. Under the circumstances assumed, therefore, the calling station 72, broadcasting on 35 kilohertz, knows that station 26 will respond on channel 6 at 75 kilohertz.

The microprocessor 16 now activates its modem 132 to broadcast the phone number "26" a sufficient number of times such that station 26 will recognize the number as it cycles through the eleven frequencies. That is, in the absence of a received call, the receiving oscillator 40 is constantly being cycled through frequencies which will produce intermediate frequencies at the output of mixer 86, for example, corresponding to those of the eleven channels. In this respect, the modem 132 at the sending station converts a parallel digital signal identifying the station 26 into a serial digital signal which is applied to the modem, using the 1-megahertz signal on lead 138 as a reference. The modem utilizes two frequencies, 1070 and 1270 hertz, one of which represents an "OFF" digital signal and the other of which designates an "ON" digital signal. This serial digital signal is then applied to audio amplifier 52 via lead 142 and modulated to produce the previously-selected carrier frequency at the output of mixer 58. In the example given, this will be 35 kilohertz. The modem at the called station 26 recognizes this number as it cycles through the eleven frequencies. If no response is received at the calling station on 75 kilohertz, called station 26 is assumed to be engaged in a conversation and a busy signal is generated at the calling station 72. If the called station 26 responds correctly, however, the communication link is complete and the station 26 will generate a ring signal through its loud-speaker and also through its transmitter via the signal on lead 168 also applied to the audio amplifier 52. Calling station 72 will thus receive the ring and direct the ring to its earphone 110. When the push-to-talk switch 126 at the called station 26 is activated, the processor communicates via the modem 132 and the ring is terminated. At this point, communication between the two stations is established.

Figure 3A:
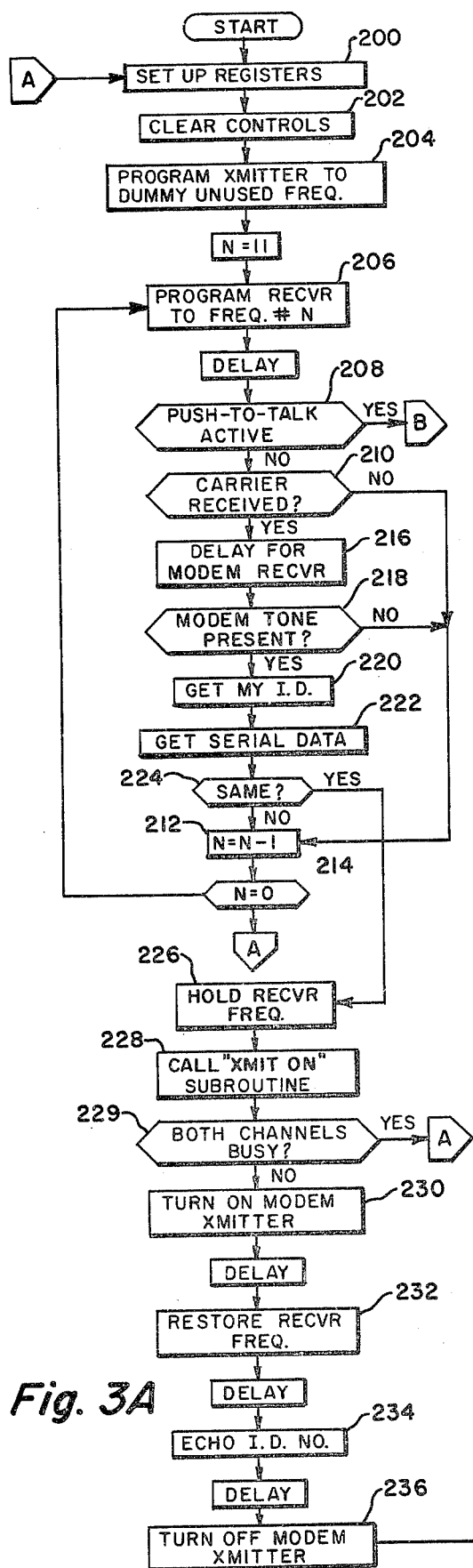
FIGS. 3A–3C (when placed side-by-side) comprise a flow diagram of the computer program used in the microprocessor of each station in the telephone system.
Figure 3A:
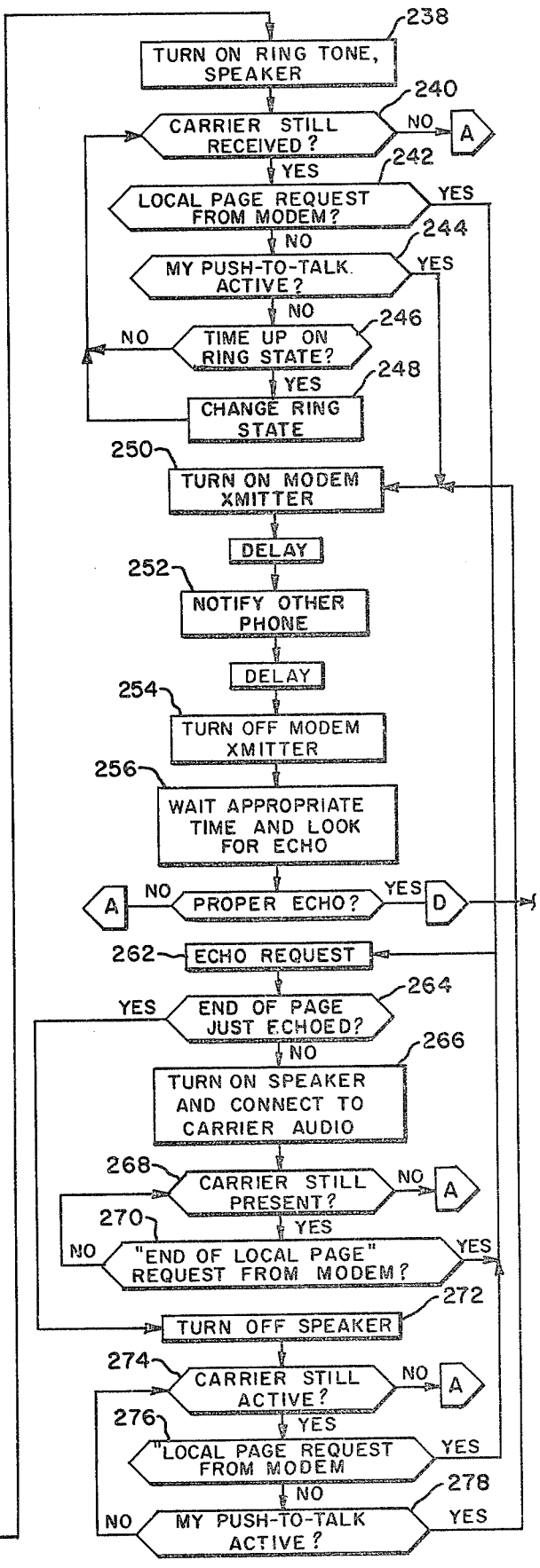
Figure 3B:
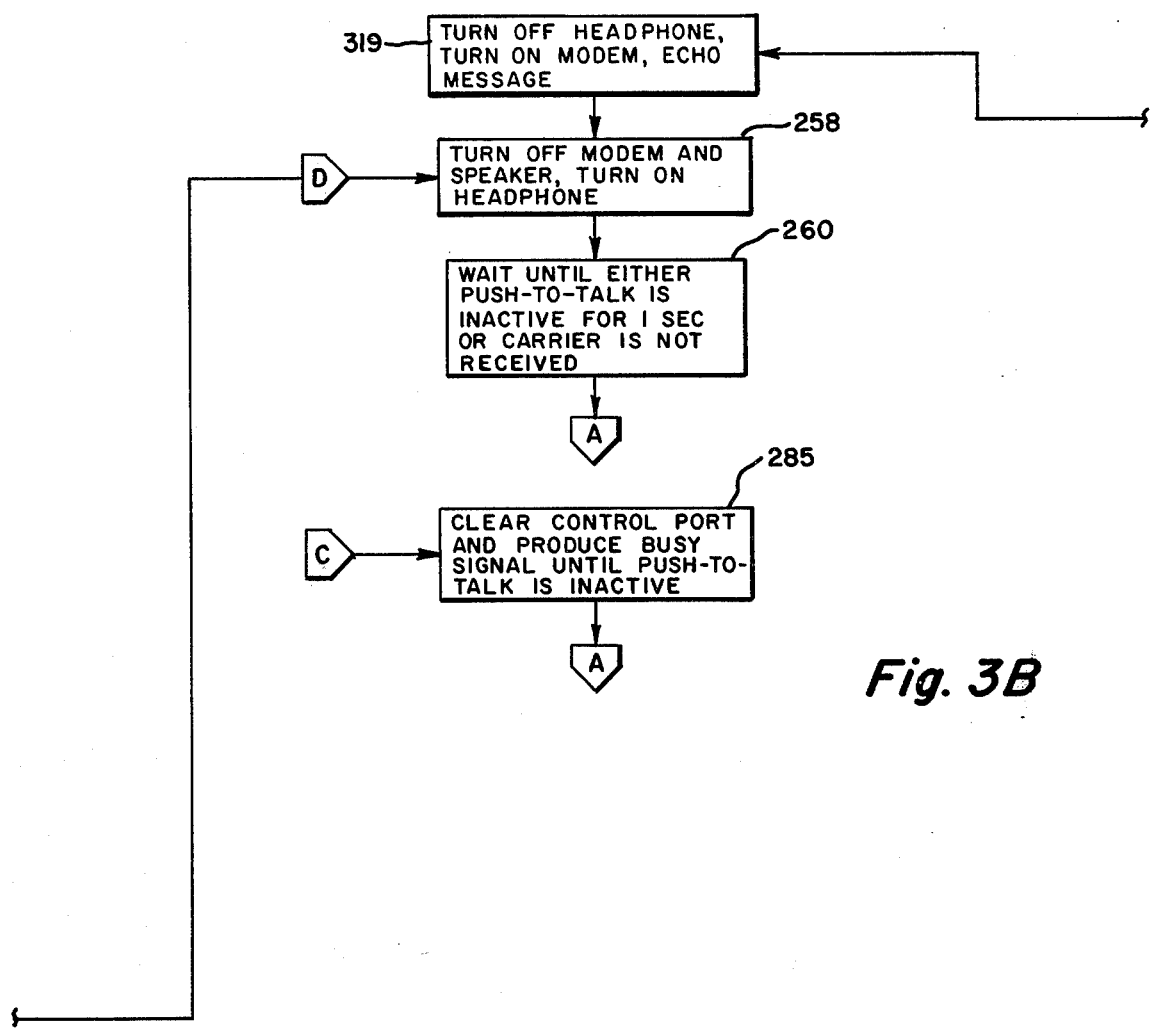
Figure 3C:
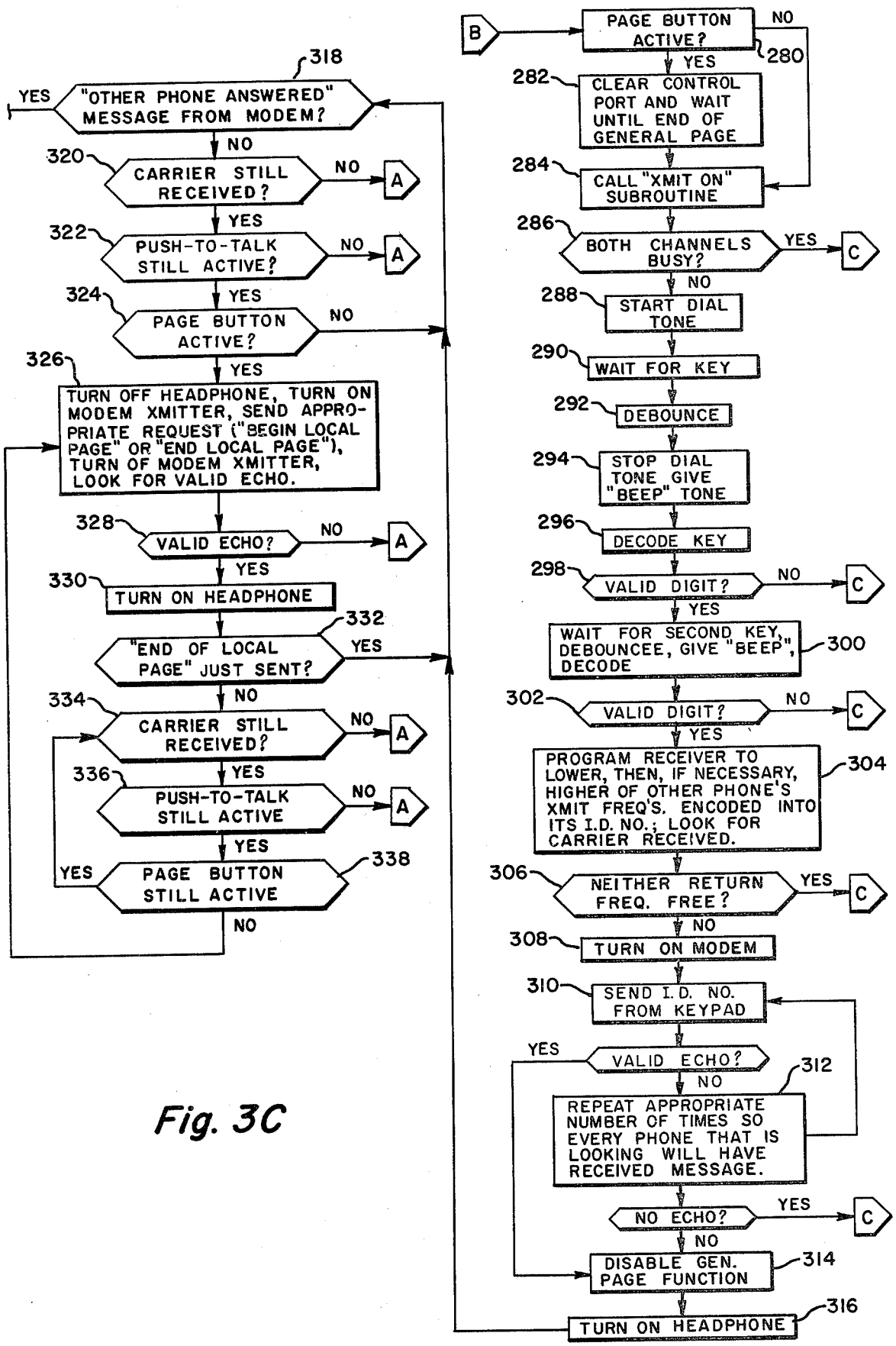

A flow diagram for a computer program for carrying out the foregoing process in microprocessor 16 is shown in FIGS. 3A–3C. The receiving station program A (FIG. 3A) starts at 200 by initially setting up the registers inernal to the processor. Thereafter, the controls are cleared at 202 and the transmitter (i.e., transmitter oscillator 38) is programmed to transmit a dummy unused frequency which is written into the program and which is known to be unused by any phone station. The receiver local oscillator 40 at the receiving station is then programmed at block 206 for a particular frequency, in this case the highest frequency carrier out of the eleven carrier frequencies. This is accomplished via interface 26 of FIG. 2B and lead 36. The program then progresses, after a delay, to determine whether the push-to-talk switch 126 at the receiving station has been activated at 208. If it has been activated, program B for a calling station, hereinafter described, is initiated. Assuming, however, that the push-to-talk switch has not been depressed as determined at 208, it is then established at 210 whether there is a carrier received signal on lead 90 from detector 88. If a carrier is not received at the highest frequency, then the receiver is programmed at 206 to receive the next lower frequency via blocks 212 and 214. In this manner, the various possible channels are sampled one after the other via interface 26 of FIG. 2B. Assuming that a carrier signal has been received, there is a delay encountered to insure that the data from the modem 132 at a sending station is valid. After this delay, as indicated at 216 in FIG. 3A, it is then determined whether modem information is being received on that frequency at 218. If it is not, then the receiver oscillator 40 is programmed to the next lower frequency, again via blocks 212 and 214. However, if the modem tone is present, the phone identification switches 48 (FIG. 2B) are read at 220 and these are compared with the serial data from the sending modem 132 at 222 to determine whether they are the same at 224. Assuming that they are the same, the station in question is being called; and the next step in the program at 226 is to hold the receiver frequency in storage. At this point, therefore, the receiving station has searched the possible received frequencies, a modem signal has been detected identifying a receiving station and this modem signal compared with the data in identification switches 48 to establish that that particular receiving station is being called.

The next step in the process is to determine the transmit frequency as determined from the identification number at the receiving station derived from the phone identification switches 48 at that station. In this process, the lower frequency is initially checked to determine whether it is being used in the system. Assuming that it is not, this lower frequency is then employed to transmit signals from the receiving station. On the other hand, if the lower frequency is being used as determined by the signal on lead 90 from the amplifier and detector 88, the next higher frequency corresponding to the telephone number of the receiving station being called is employed. If it is determined at 228 that both channels assigned to the receiving station are busy (block 229), then program A will again be initiated, starting at block 200. However, if both channels are not being used, the next step in the process is to turn ON the transmitting function of the receiver station modem at 230 to transmit back to the calling station the modem message received at 222. This occurs via signals on leads 134 and 136 of FIGS. 2A and 2B. After a delay insuring that the modem will broadcast valid data, the receiver frequency is recovered from memory at 232 and the receiver (i.e., receiver oscillator 40) is programmed to receive signals on the frequency determined by he receiver-hold frequency at 226. After another delay, the transmitter sends back to the calling station at 234 its identification number which is the same as that received at 222 by the receiving station. After a further delay, the modem transmitter is turned OFF at 236. Communication has now been established between the two stations.

The next step in the process is to initiate a ring signal and turn ON loud-speaker 108 via the controller 114 and register 42 at 238. Once the ring tone is initiated, the program checks to determine whether the carrier signal is still received at 240, whether a local page request from the modem 132 has been made and whether the push-to-talk switch 126 at the receiving station has been activated. This occurs at blocks 242 and 244. If the answer to the inquiry at 240 is "Yes" while that at 242 and 244 is "No", then the process at 240 and 244 is repeated. Concurrently, the processor will interrupt the ring tone at periodic intervals via blocks 246 and 248.

The periodic ringing process will continue in this manner at the receiving station until it is determined that the carrier is no longer received at 240, that there is a local page request from the modem 132 at the receiving station at 242 or that the push-to-talk switch at the receiving station has been depressed as at 244. Assuming that a carrier is no longer received, the entire program A is again initiated. However, assuming that the carrier is still received and that the push-to-talk switch at the receiving station is depressed as determined at 244, a new routine is initiated at 250 wherein the modem transmitter 132 is again activated. After an appropriate delay, the transmitting phone is notified at 252 by a special code stored in the computer that the called phone has been answered. After the caling phone has thus been notified that the called phone has been answered by depressing its pushbutton switch, the modem transmitter at the called station is turned OFF or deactivated at 254. After an appropriate time, the microprocessor at the receiving station then determines whether the signal transmitted by its modem has been received by the calling station. Assuming that a proper echo has not been received back at the receiving station from the transmitting station, then the entire program A is reinitiated. However, if a proper echo is received, then program D (FIG. 3B) is initiated which is the same for both the receiving station as well as the transmitting station.

At program D, the modem transmitter is turned OFF at 258 and controller 106 controlled by a signal on lead 124 (FIGS. 2A and 2B) is activated to connect the earphone to the amplifier 96. The next step in the program, during a normal conversation, is to wait until either the push-to-talk switch is inactive for one second or the carrier is not received at block 260, in which case the conversation has been terminated and the program A is again reinitiated.

At block 242 (FIG. 3A), the processor at the receiving station receives through its modem a special code sent from the transmitting station requesting the initiation of a local page (via switch 68 at the transmitting station). Confirmation that this request is received is sent back to the transmitting station in the form of an echo through the modem as described in blocks 250–254. This is indicated by the block 262. If at block 264 it is determined that the message just received was a request to initiate a page, then at block 266, the speaker is turned ON and connected to the carrier audio via lead 112 and controller 114. The processor then begins checking to deterine whether the carrier is still present at block 268 and if there is an "end of local page" special request being received from the transmitting station at 270. If neither of these conditions is true, the process just described in blocks 268 and 270 is repeated. If the carrier is determined to be no longer present, the program is again initiated at A. If an end local page special request is received from the modem at block 270, this request is echoed to the transmitting phone in block 262. If at 264, it is determined that an end-of-page request was just received and echoed, then at 272, the loud-speaker 108 is turned OFF via controller 114 and the processor begins checking to determine whether the carrier is still present at 274, whether a local page request from the modem has been made at 276 and whether the push-to-talk switch is still active at 278. If the carrier is present and if there is no special request for a local page from the modem and if the push-to-talk switch is not active, the process at blocks 274–278 is repeated. If the carrier is determined to be no longer present, the control is returned to the beginning of the program A. If a local page initiation special request is received from the modem as determined at blocks 276, then the process beginning at block 262 is repeated the same as when it is initiated from block 242.

If the push-to-talk switch is found to be active at block 278, then the process beginning at block 250 as previously described is initiated.

If at block 208, the push-to-talk switch is found to be active, the program control is transferred to program B (FIG. 3C) wherein the station referred to above is hereafter referred to as the calling or transmitting station. If at block 280, the page button is found to be active, this indicates that a general page is in progress using the baseband in block 282. The control port is cleared and the processor waits until the general page is eliminated as indicated by an inactive page button. If the page button is found to be inactive at block 280, then the calling phone's identification number is decoded to find the two allowed transmit frequencies at 282 and 284 and these are examined to find a free chanel in which to transmit as referred to in block 228. If both channels are found to be busy in block 286, then the control is passed to program C (block 285, FIG. 3B) where the control port is cleared and a busy tone is generated. This tone continues until the push-to-talk button becomes inactive at which point control is returned to program A which is reinitiated. Assuming that one of the two channels is not busy, then the transmitter will be programmed to that channel and the carrier amplifier 66 is turned ON by a signal on lead 78 from the status register 42. At the same time, the status register 42, via lead 164, activates the controller 162 to initiate a dial tone at the calling station (block 288). At that point, the program waits for a depression of the pushbuttons 46 at the calling station (block 290) which identify the station which is to be called. Thereafter, the signals from the keyboard 46 are monitored or examined at 292 until a constant signal is derived indicative of the true and numerical values of the keys which were depressed on the keyboard 46. After the operation at 292, the dial tone is stopped at 294 by means of a signal on lead 164 from the status register 42 which deactivates the controller 162 to stop sending a dial tone. Following termination of the dial tone, the program then proceeds to the decode key 296 which registers in the microprocessor 16 the numerical value of the key depressed on the keyboard 46. Assuming that the pushbutton depressed represents a valid digit as determined at 298, the program waits for depression of a second key followed by a debouncing operation at 300. Thereafter, it is again determined whether the second pushbutton depressed represents a valid digit at 302. If either operation at 298 or 302 determines that the pushbutton depreesed was not a valid digit, then program C (FIG. 3B) will be initiated which clears the control port and produces a busy signal until the push-to-talk switch 126 is released. Assuming, however, that both the first and second pushbuttons depressed represent valid digits, then the program proceeds to block 304 where the receiver at the calling station is programmed to receive the lower frequency of the called station and if necessary the higher frequency of the called station if the lower frequency should already be in use at block 204 as described above. If neither return frequency from the called station is free as determined at block 306, then the program proceeds to program C and a busy signal is initiated. On the other hand, if one of the two return frequencies is free, the program proceeds to block 308 where the modem 132 is turned ON and the phone identification numbers as determined by the keys depressed on the keyboard 46 are sent through the modem 132 in the manner described above to the receiving station. If a valid echo is not received from the modem in the receiving station as determined at 310, then the identification number is rebroadcast from the sending station to a receiving station a number of times as at 312. The purpose of this is that the phone at the called station will be scanning all eleven frequencies and sufficient time must be given in order to permit the called station to arrive at the appropriate transmit frequency. If, after a number of transmissions, no echo is received, then the busy program C is initiated. If an echo is received back at the sending station, the local page function is enabled at block 314 by virtue of the status register 42 which disables the general page function at the sending station. After the general page function is disabled at 314, the earphone 110 at the sending station is activated by virtue of a signal from the status register 42 on lead 124 at block 316. Thereafter, a check is made at 318 to determine from signals received by the modem 132 whether the phone at the receiving station has been answered as described above in connection with blocks 250 and 252. Assuming that the other phone has been answered, the earphone 110 is turned OFF at block 319 (FIG. 3B), the modem 132 is turned ON and an echo message is sent back to the receiving station to indicate that the message has been received. Thereafter, the conversation session of the communication is initiated as indicated by program D.

Assuming, however, that the other phone at the receiving station has not been answered, a check is then made at 320 to determine whether the carrier is still received at the sending station. If it is not, program A is reinitiated. However, if the carrier is still received, a check is made at 322 to determine whether the push-to-talk switch at the sending station is still depressed. If it is not, program A is again initiated. If the push-to-talk switch is still depressed, then a check is made at 324 to determine whether the page button is depressed at the sending station; and if it is not, the program starting at block 318 is again initiated. However, if the page button is activated, the headphone is turned OFF at the sending station, the modem transmitter 132 at the sending station is activated at 326, an appropriate request is transmitted via the modem; and thereafter the modem is turned OFF and examined for a valid echo as at 328. If no valid echo is received as determined at 328, then program A is again initiated. However, if a valid echo is received, the earphone 110 is turned ON in block 330. Following this action in block 332, the message just sent is examined to see whether it was special code to begin local page and if it was, the sequence of blocks 334, 336 and 338 is entered. If in block 334, the carrier is found to be no longer received, then the entire program is reinitiated at A. In block 336, if the push-to-talk switch at the sending station is found to be no longer active, the entire program is also reinitiated at A. If in block 338, the page button is found to be still active, then the sequence of blocks 334, 336 and 338 is repeated. If in block 338, the page button is no longer active, the program advances to block 326 where the headphone is turned OFF and the modem message is sent as described above. However, if the message at this point is to end a local page, then a different special code is sent. If a valid echo of this message is not received, the program is restarted at A. If a valid echo is received, then at block 330 the headphone is turned ON. At block 332, the message just sent is checked to determine whether it is to begin or to end a local page. If, in this case, the message was to end a local page, then control is passed to block 318 as was originally done when communication between the two processors was established.

In the system just described, the received and transmitted frequencies are a function of the telephone numbers of the two communicating stations. That is, either frequency corresponding to the two digits of the number of a calling station can be used to transmit to a called station; and either frequency corresponding to the two digits of the number of a called station can be used by that station to transmit back to the calling station.

However, it is also possible to assign two frequencies to each conversation in a different manner. In this system, one discrete set of carrier frequencies is used for calling stations to initiate calls and a second set of discrete frequencies is used for response by called stations. Each frequency of one set is assigned a corresponding frequency of the other set so that specific pairs of frequencies are provided for each voice channel. That is, when a call is made, the calling station transmits on one of the first set of carrier frequencies and the called station responds by transmitting on the corresponding one of the second set of frequencies, the frequencies being determined via the microprocessor 16 by controlling the local oscillators 38 and 40 of the respective stations.

The manner in which this is done can best be explained by a specific example using the illustrative embodiment mentioned above in which a band of carrier frequencies from 16 to 136 kilohertz is used for transmission. To avoid confusion, the calling station, that is, the station which initiates a call, will be referred to as Station 1, and the called station, that is, the station which receives the call, will be referred to as Station 2. In the specific example, the bandwidth of each voice channel is taken as 6000 hertz with a stop band at 2000 hertz on each side, so that the difference between adjacent center frequencies is 8000 hertz and sixteen voice bands are thus provided in the range from 16 to 136 kilohertz. This provides eight conversation channels, to which is added one low frequency base channel at 3 kilohertz. Each conversation channel is assigned two transmission frequencies, resulting in two sets of frequencies with a one-to-one correspondence between specific frequencies of each set, as shown in the following Table. The first two lines of the table show the center frequencies for each of the eight channels for Station 1 and Station 2, respectively:

| Channel Numbers | 1 | 2 | 3 | 4 | 5 | 6 | 7 | 8 | |
|---|---|---|---|---|---|---|---|---|---|
| Transmission Center | 16 | 24 | 32 | 40 | 48 | 56 | 64 | 72 | Station 1 |
| Freq. in KHz | 80 | 88 | 96 | 104 | 112 | 120 | 128 | 136 | Station 2 |
| Transmitter LO | 216 | 224 | 232 | 240 | 248 | 256 | 264 | 272 | Station 1 |
| Freq. in KHz | 280 | 288 | 296 | 304 | 312 | 320 | 328 | 336 | Station 2 |
| Receiver LO | 240 | 248 | 256 | 264 | 272 | 280 | 288 | 296 | Station 1 |
| Freq. in KHz | 304 | 312 | 320 | 328 | 336 | 344 | 352 | 360 | Station 2 |

Instead of determining the carrier frequencies from the telephone numbers of the calling and called stations as in the embodiment just described, a call may be made by Station 1 using any one of the carrier frequencies in the first line which is not already in use, and the called station, Station 2, will respond on the corresponding carrier frequency in the second line. These frequencies do not depend on the numbers assigned to Stations 1 and 2. The necessary transmitter local oscillator frequencies are shown in the third and fourth lines for the oscillators 38 of the respective stations, and the corresponding local oscillator frequencies for the receiver oscillators 40 of the respective stations are shown in the fifth and sixth lines. If Station 1 initiates a call on a frequency of 16 kilohertz (Channel 1), for example, the transmitter local oscillator 38 generates a carrier frequency of 216 kilohertz. Station 2 receives the transmitted signal; and its receiver local oscillator 40 generates a frequency of 240 kilohertz to provide the desired intermediate frequency signal to the detector 88 of Station 2. Station 2 responds to the call by transmitting its carrier signal on the corresponding transmission frequency of 80 kilohertz, which requires the transmitter local oscillator 38 of Station 2 to generate a carrier frequency of 280 kilohertz. Station 1 responds to the frequency of 80 kilohertz received from Station 2 by generating a frequency of 304 kilohertz in its receiver local oscillator 40 to obtain the intermediate frequency output signal to receive Station 2. Thus, the operation is that the calling station transmits its carrier signal on any one of the transmission frequencies which is not in use and the called station responds by transmitting on the assigned corresponding frequency. In this way, frequency division multiplexing is used to provide the desired number of channels and duplex operation is achieved by assigning two frequencies to each channel.

The operation of this alternative embodiment has been generally outlined above but may be more completely described as follows, keeping in mind that the complete equipment illustrated in FIGS. 2A and 2B is duplicated at each station 10. When a particular station is not in use, its receiver, of course, remains connected to the line 12 and any carrier signals present on the line are received. The receiver oscillator 40, under control of the microprocessor 16, continuously scans the entire range of local oscillator frequencies which are mixed with the received carrier signals. Each received signal, therefore, results in an intermediate frequency signal to the amplifier and detector 88. If the particular station is not being called, this does not cause any response but the presence of the received carrier frequencies is signaled to the microprocessor 16 through the modem 132. The microprocessor at each station, therefore, knows at all times what transmission frequencies are in use.

If it is desired to make a call from a particular station (Station 1), the caller picks up the handset 14. This actuates the push-to-talk switch 126 which sends a signal to the microprocessor 16 through lead 130. The microprocessor determines if there are any transmission frequencies not in use, and if any such frequencies are available, the microprocessor selects an unused frequency and sets the transmitter oscillator 38 to generate the appropriate local oscillator frequency, as previously described. At the same time, a signal is transmitted from the status register 42 to the controller 162 via lead 164 to connect the 500 hertz dial tone to the earphone 110, and a transmit signal is sent from the register 42 via lead 78 which enables the carrier amplifier 66. A carrier signal of the selected frequency is thus sent out on the line 12 from Station 1. Immediately upon hearing the dial tone, the caller can call the desired station (Station 2) by dialing its number on the keyboard 46 in the usual manner. This results in a signal from the modem 132 (actuated via lead 140) which is applied via lead 142 to suitably modulate the carrier signal in modulator 58 to transmit a coded signal designating Station 2. At the same time, the microprocessor at Station 1 has set the receiver oscillator 40 of Station 1 to generate the necessary frequency for receiving the carrier frequency to be used by Station 2 in responding to the call (see above Table).

If Station 2 is busy, a signal on lead, not shown, is sent from the status register 42 of Station 1 to the controller 162. This causes the controller to repetitively interrupt the 500 hertz tone at a relatively rapid rate, such as ½ second ON and ½ second OFF, which serves as a busy signal.

If Station 2 is not in use, its receiver is continuously scanning the line 12 for transmitted carrier signals, as mentioned above. That is, the receiver oscillator 40 repetitively generates all the frequencies in its range which are combined with any carrier frequencies present on the line. This results in an intermediate frequency signal for each such carrier frequency and these intermediate frequency signals are amplified in the amplifier 88. If the associated detector detects the modulation for Station 2 on one of these signals, a carrier received signal, indicated at 90, is sent to the microprocessor 16. The microprocessor 16 stops further scanning by the oscillator 40 and the oscillator continues to generate the frequency corresponding to the received carrier signal from Station 1. The microprocessor 16 at Station 2 also sets the transmitter oscillator 38 of that station to generate the frequency necessary to provide the carrier frequency assigned for responding to the frequency received from Station 1 (see Table). At the same time, a ring signal, on lead 166, is sent from the status register 42 of Station 2 to the controller 162 to cause the controller to connect the 1000 hertz ring tone to the loudspeaker 108 of Station 2 via lead 168 so that it will be heard for a reasonable distance. The ring tone on lead 168 is also applied through amplifier 52 to modulator 56 to modulate the carrier frequency being transmitted by Station 2 so that the caller at Station 1 will also hear the ring tone. To answer the call at Station 2 it is only necessary to pick up the handset at that station and answer. Each station continuously transmits a carrier signal on its assigned frequency so that both parties can talk and carry on a conversation in a normal manner. Upon termination of the call by hanging up the handset at each station, the respective microprocessors terminate the carrier transmissions and return both stations to the continuous scanning described above.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A telephone system comprising a plurality of stations, a single line cable interconnecting all stations in the system, each station including transmitting means, receiving means and switching means, the switching means in each station comprising a self-contained computer adapted to control said transmitting and receiving means at each station to provide frequency multiplexed communication between selected pairs of stations in the system without the use of any auxiliary switching or control means connected to said cable other than the self-contained computers in the respective stations, means at each of said stations for imposing a page signal on said single line cable, and means at each of said stations for receiving said page signal.

2. The system of claim 1 in which the computer of each station controls the frequency transmitted by its transmitting means and the frequency received by its receiving means.

3. A telephone system comprising a plurality of stations, a single line cable exclusive of any central station circuitry interconnecting all stations in the system, transmitting and receiving means at each station, multiplexing means at the respective stations for establishing communication via carrier signals between any two selected stations in the system, and a computer in each station of the system, said computers acting to establish communication between any two stations in the system exclusive of all other stations and independently of any other instrumentality in the system other than the computers of the stations between which communication is established, each station in the system being assigned a telephone number and each digit of a telephone number being assigned a specific frequency, the computer at each station being adapted to cause its transmitting means to transmit on a frequency corresponding to a digit in its telephone number.

4. A telephone system comprising a plurality of stations, means at each of said stations for transmitting and receiving carrier signals, a computer at each of said stations, a modem at each of said stations, the computers and modems at any two selected stations in the system acting to establish communication between those stations exclusive of all other stations in the system, a conductor exclusive of any central circuit component common to all stations for interconnecting said stations, whereby communication can be established between any two stations in the system without the use of any central circuit components, means at each of said stations for imposing a page signal on said conductor, and means at each of said stations for receiving said page signal.

5. The system of claim 4 including loud-speaker means connected to the page signal receiving means at each station.

6. A telephone system comprising a plurality of stations and a common conductor interconnecting the stations, each of said stations having transmitter means including a first local oscillator and adapted to generate a modulated carrier signal for transmission on said common conductor at a frequency determined by said first oscillator, receiving means including a second oscillator adapted to receive and demodulate signals present on said conductor of frequency determined by said second oscillator, and computer means for controlling the frequencies of said oscillators to cause said transmitter means to transmit on a first preselected frequency and to cause said receiving means to receive signals of a second preselected frequency, each station being assigned a telephone number and each digit of a telephone number being assigned a specific transmitting frequency, the computer means at each station being adapted to cause its transmitter means to transmit on a frequency corresponding to a digit in its telephone number.

7. The system of claim 6 including means for causing transmission by a first station and reception by a second station of signals of said first preselected frequency, and means for causing transmission by the second station and reception by the first station of signals of said second preselected frequency.

8. The system of claim 6 in which each station includes means for transmitting individual call signals for each other station, and in which reception by a second station of its call signal on said first preselected frequency initiates transmission by said second station on said second preselected frequency.

9. The system of claim 8 in which each station includes a loud-speaker, means for producing a ring signal, and means controlled by said computer means for supplying said ring signals to the loud-speaker upon reception of that station's call signal.

10. The system of claim 8 in which each station includes a loud-speaker, means in each station for generating a low-frequency carrier signal and for transmitting page messages on said carrier signal, and means in each station for receiving said low-frequency carrier signal and for supplying said page messages to its loud-speaker.

11. The system of claim 10 including means by which transmission of a page message by one station after calling another station results in reception of the page message by the called station only.

12. The system of claim 6 wherein said computer means causes said transmitter means to transmit on one of a set of preselected frequencies and causes said receiving means to receive signals of a corresponding one of another set of frequencies, each frequency of one set corresponding to a single frequency of the other set.

13. The system of claim 6 including means in the computer means of each station for sampling carrier frequencies on said conductor interconnecting the stations, means at each station for causing that station to initially transmit on a carrier frequency corresponding to the lowest digit in its telephone number, and means responsive to the sampling means for causing said station to transmit on a carrier frequency corresponding to the next highest digit in its telephone number when the sampling means determines that the frequency corresponding to said lowest digit is already present on said conductor interconnecting the stations.

14. The system of claim 6 wherein each of said stations is provided with a modem and wherein code signals are transmitted by said modem on a carrier frequency corresponding to a digit in the telephone number of a calling station to a called station which responds to said code signals on a carrier frequency corresponding to a digit in the telephone number of the called station.

* * * * *